United States Patent [19]

Blamire et al.

[11] Patent Number: 4,700,156
[45] Date of Patent: Oct. 13, 1987

[54] END CLOSURE FOR TUBULAR CAPACITIVE FILTER

[75] Inventors: Michael F. Blamire; Peter F. Briscoe, both of Carrying Place; A. G. Bronson, Madoc; B. K. Doolittle, Trenton, all of Canada

[73] Assignee: Murata Erie North America, Ltd., Trenton, Calif.X

[21] Appl. No.: 727,037

[22] Filed: Apr. 25, 1985

[30] Foreign Application Priority Data

Aug. 14, 1984 [CA] Canada ................................. 460945

[51] Int. Cl.⁴ .......................... H03H 7/01; H01G 7/00
[52] U.S. Cl. ..................................... 333/182; 29/25.42; 333/185; 361/302; 361/307
[58] Field of Search ............... 333/167, 175, 181–185; 29/25, 42; 228/118; 361/302, 303, 306, 307

[56] References Cited

U.S. PATENT DOCUMENTS 3,035,237  5/1962  Schlicke ............................. 333/182
3,249,834  5/1966  Schlicke et al. ..................... 361/302
3,275,954  9/1966  Coda et al. ..................... 361/302 X

FOREIGN PATENT DOCUMENTS 154248  11/1951  Australia ............................. 361/306

Primary Examiner—Paul Gensler
Attorney, Agent, or Firm—Rogers & Scott

[57] ABSTRACT

The invention provides a tubular filter having end caps which deform on insertion into a tubular ceramic capacitor to engage snugly within the capacitor and about a central lead to provide support for solder plugs melted into the ends of the filters.

11 Claims, 3 Drawing Figures

END CLOSURE FOR TUBULAR CAPACITIVE FILTER

This invention relates to filters of a type used in electronic circuitry and having a tubular dielectric carrying inner and outer leaves of a capacitor, and more particularly to electromagnetic interference filters having such a capacitor and also containing an inductive and resistive element.

The invention will be described with particular reference to electromagnetic interference (EMI) or low pass filters but it will become evident that the invention applies to similar structures where variations in tolerancing of the components is a particular problem.

Tubular or so-called "feed-through" filters have essentially a tubular capacitor, a lead extending coaxially through the tubular capacitor, some form of end cap sealing ends of the structure and connecting the lead to the inner leaf of the capacitor, and a ferrite sleeve about the lead and within the capacitor. The end caps are soldered to the ends of the capacitor where the inner leaf of the capacitor terminates.

Because the capacitor is made from a ceramic tubular dielectric, the allowances on the sizing have to be quite generous. Not only does the length vary, but the ends are not always square to the axis of the tube, and the tube itself is commonly out of round and its ends can have minor chips. Consequently it is not possible to seal the end by entering a toleranced plug because the variations in roundness and sizing would necessitate a force fit which would crack or break the brittle ceramic. As a result, caps are used which locate loosely inside the ceramic and have flanges which rest on the end of the capacitor for sealing using a soldered joint.

Great care is required during manufacturing to avoid unsightly solder joints and the ingress of flux and solder that might result because of irregularities in the ceramic capacitors. Furthermore sorting and machining operations required to eliminate these capacitor irregularities are costly because they are labour intensive and do not lend themselves to automated procedures.

It will also be evident that because the filters are very small (typically about 11 mm long excluding leads) assembly is very labour intensive. The assembler must manipulate end caps, solder them in place and then crimp or otherwise deform the lead adjacent to the end caps to hold it axially in the filter.

It is one of the objects of the present invention to provide an improved capacitive filter which is simple to assemble, and lends itself to a more automated approach to manufacture. It is also an object to minimize losses due to unacceptable product and to provide a reliable product.

Accordingly a feed through or tubular filter is provided having end caps which deform on insertion into a tubular ceramic capacitor to engage snugly within the capacitor and about a central lead to provide support for solder plugs melted into the ends of the filters.

The invention will be better understood with reference to the drawings in which.

Figure 1:
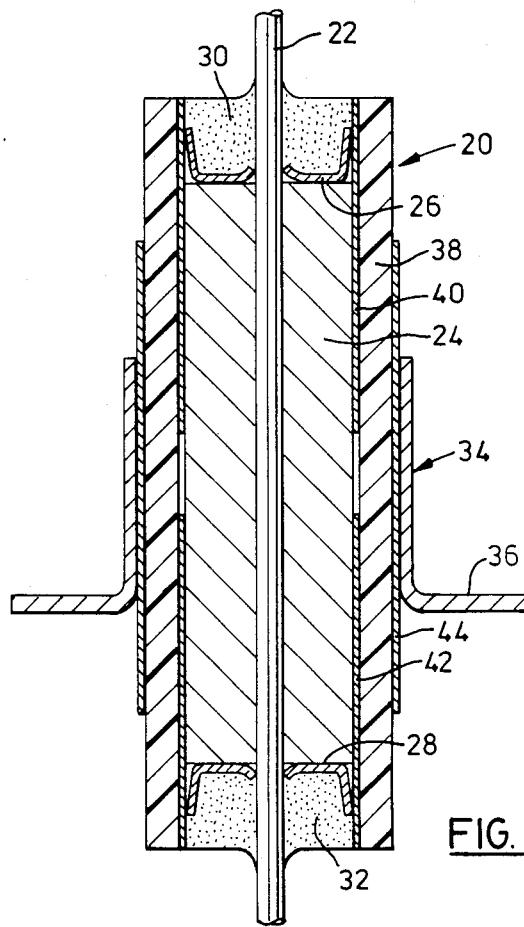
FIG. 1 is a sectional side view of a generally cylindrical EMI filter incorporating a preferred embodiment of the invention.

Reference is made firstly to FIG. 1 which illustrates a complete filter consisting essentially of a tubular capacitor 20 containing a central lead 22 and an inductive and resistive sleeve 24. The sleeve and lead are positioned within the capacitor 20 by a pair of similar end inserts 26, 28 which are engaged frictionally about the lead 22 and inside the capacitor 20. Plugs 30, 32 (typically of "high temperature" solder, i.e. typically 10% tin, 88% lead and 2% silver) are melted into ends of the capacitor and in engagement with the sleeve. The filter also includes an eyelet 34 having a radial flange 36 for mechanical and electrical attachment to supporting structure.

The tubular capacitor 20 has a tubular dielectric 38 made typically from a barium titanate based ceramic material. Without additional machining operations, materials of this type do not lend themselves to accurate tolerancing and consequently it is not uncommon for the tubular dielectric to vary in length, circularity, and even have out-of-square ends and minor chipping. Such characteristics make it difficult to tolerance parts which are to be assembled at the ends to seal the filter. The present invention overcomes these difficulties as will become apparent from subsequent description.

The dielectric 38 is coated on its inner surface at both ends with respective inner leaves 40, 42 of capacitors having a common outer leaf 44. The leaves are of a frit based silver and are fired to the ceramic dielectric. As can be seen in FIG. 1, the leaves 40, 42 terminate at respective ends of the dielectric to provide for connection to the lead 22 by the plug 30. The arrangement is such that the solder plugs can be flush with the ends of the filter thereby providing a neat appearance.

The inductive and resistive sleeve 24 is of ferrite which also does not lend itself to accurate tolerancing. This sleeve is made shorter than the capacitor to provide space for the inserts 26, 28 and the structure is such that the length of the sleeve can be within a wide range of tolerances without affecting the finished product. This is because the inserts are positioned in contact with the sleeve no matter whether it is maximum or minimum length as will be described.

The inserts 26, 28 are friction fits on the lead 22 and also within the capacitor 20. As will be described with reference to FIGS. 2 and 3, these inserts are pushed into place and deformed as they are entered into the capacitor. Such deformation is capable of absorbing significant variations in both the internal diameter of the capacitor and also the roundness of the opening. Further, the insert is not dependent at all on the squareness of the end of the capacitor relative to its axis so that tolerancing in this regard is unimportant. This contrasts with the prior art where caps were placed over the ends of the capacitor and any variation in squareness could affect the seating of the cap and the eventual seal.

Figure 2:
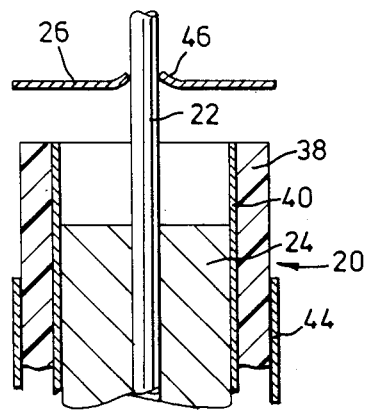
FIG. 2 is a view similar to FIG. 1 and showing one of the steps in the manufacture of the filter.
Figure 3:
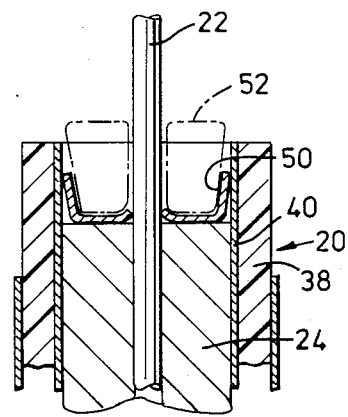
FIG. 3 is a view similar to FIG. 2 showing a subsequent step in the manufacture.

To better understand how the inserts 26, 28 are positioned, reference is made to FIGS. 2 and 3. As seen in FIG. 2, the insert is essentially a solder coated soft copper disc, of thickness in the range 0.001–0.003 and preferably 0.0015 inches thick, and having a central opening which is proportioned so that the disc is a force fit on the lead 22. In FIG. 2, the disc has been pushed on to the lead and some deformation around the opening is apparent at 46.

FIG. 3 shows the disc having been pushed along the lead 22 and inside the capacitor 20 such that an outer portion 50 of the periphery of the disc becomes essentially cylindrical and is in firm engagement with leaf 40 of the capacitor. In this position, the insert performs several functions. Firstly, there is a mechanical seal sufficient to minimize the possibility of molten solder and flux coming into contact with the sleeve 24; secondly the lead 22 is centered naturally by the insert; thirdly the friction fit of the lead in the insert results in the lead being located positively and removing the need for separate deformation of the lead to hold it in place; and fourthly the sleeve 24 is located between the pair of inserts 26, 28 (FIG. 1) because the inserts are simply pushed until they meet the sleeve.

FIG. 3 also illustrates in ghost outline a solder pre-form 52 which can be placed on the disc prior to its engagement in the FIG. 3 position so that the tool used to push the disc can simply press on the pre-form to transfer the load to the disc. The resulting intermediate structure will have the pre-form as shown in FIG. 3 and then with the application of suitable heating, this pre-form can be melted into place to finish the structure as shown in FIG. 1. It is preferable to use the high temperature solder already described so that when the filter is complete, the ends will resist damage from heat applied to melt low temperature solder in the proximity of the structure.

The filter can be modified within the scope of the invention. In general any tubular capacitor can be sealed and its lead centered and attached using the invention. It is to be noted that variations in sizes of the components will not normally affect the assembly and that the resulting filter tends to be free from defects which could otherwise result from variations in dielectric sizing and accurate shaping.

In particular, the inserts could be preformed, preferably of a conductive material. However, other materials capable of withstanding the soldering temperature could be used as long as they are compatible with the solder.

These and other modifications are within the scope of the invention as described and claimed.

Instead of solder it will be appreciated that a synthetic plastics material impregnated with a conductor could be used. Such materials are intended to be included by the term "solder" used in this specification.

We claim:

1. A capacitive filter for use in electronic circuitry, the filter comprising:
   a tube of dielectric material having ends and inner and outer surfaces;
   inner and outer capacitor leaves carried respectively on the inner and outer surfaces of the tube;
   a lead extending centrally through the tube and extending beyond the ends of the tube for electrical connection;
   a pair of radially extending inserts engaged within the tube and spaced from respective first and second ends of the tube each of the inserts including an axially outwardly deformed generally cylindrical outer portion in contact with the inner capacitor leaf and an axially outwardly deformed portion in contact with the lead to close off the tube adjacent the ends of the tube between the tube and the lead and to lock the lead longitudinally relative to the tube; and
   a pair of solder plugs melted into position and covering the respective inserts at the ends of the tube, the solder plugs extending radially and being in electrical and sealing engagement directly both with the inner leaf and with the lead.

2. A filter as claimed in claim 1 in which the tube is of a ceramic material.

3. A filter as claimed in claim 1 in which the inserts are of an electrically conductive material.

4. A filter as claimed in claim 1 and further comprising electrical connection means coupled to the outer leaf of the capacitor.

5. An electromagnetic interference filter for use in electronic circuitry, the filter comprising:
   a tube of dielectric material having ends and inner and outer surfaces;
   inner and outer capacitor leaves carried respectively on the inner and outer surfaces of the tube;
   a lead extending centrally through the tube and extending beyond the ends of the tube for electrical connection;
   a sleeve of a material which is both inductive and resistive at higher frequencies, the sleeve enveloping the lead and being axially shorter than the tube;
   a pair of radially extending inserts engaged within the tube and spaced from respective first and second ends of the tube each of the inserts including an axially outwardly deformed generally cylindrical outer portion in contact with the inner capacitor leaf and an axially outwardly deformed portion in contact with the lead to close off the tube adjacent the ends of the tube between the tube and the lead and to lock the lead longitudinally relative to the tube; and
   a pair of solder plugs melted into position and covering the respective inserts at the ends of the tube, the solder plugs extending radially and being in electrical and sealing engagement with the inner leaf and with the lead.

6. In a capacitive filter including a tubular capacitor having an internal surface defining an internal diameter, about alead having an external diameter and extending through the tubular capacitor, the improvement comprising:
   a pair of inserts deformed from discs each of which has a central opening smaller than said external diameter and an outer diameter larger than said inside diameter and forced over the lead and into the internal surface of the capacitor, the inserts being positioned spaced from respective first and second ends of the capacitor so that the inserts each define an axially outwardly deformed generally cylindrical outer portion in contact with said internal surface and an axially outwardly deformed portion in contact with the lead to retain the lead in position relative to the capacitor.

7. Apparatus as claimed in claim 6 and further comprising solder plugs melted in contact with the inserts and an inner surface of the tubular capacitor.

8. In an electromagnetic interference filter including a tubular capacitor having an internal diameter, and an inductive and resistive sleeve about a lead having an external diameter and extending through the tubular capacitor, the improvement comprising:
   a pair of inserts deformed from discs each of which has a central opening smaller than said external diameter and an outer diameter larger than said inside diameter and forced over the lead and into the internal surface of the capacitor, the inserts being positioned spaced from respective first and second ends of the capacitor so that the inserts each define an axially outwardly deformed generally cylindrical outer portion in contact with said internal surface and an axially outwardly deformed portion in contact with the lead to retain the lead in position relative to the capacitor, the inserts also being in contact with ends of the sleeve to prevent axial movement of the sleeve.

9. A method of manufacturing a capacitive filter of the type having a tubular capacitor with an inside surface defining an inside diameter, and a central lead coaxial with the capacitor, the method comprising the steps:
  (a) engaging a disc having a central opening axially over one end of the lead, the opening being proportioned so that the disc is deformed locally about the opening as the disc is forced on to the lead to form an axially extending deformed portion;
  (b) moving the disc along the lead into engagement with an end of the capacitor, the outer diameter of the disc being significantly greater than said inside diameter of the capacitor;
  (c) pushing the disc into the capacitor and along the lead to deform the periphery of the disc into a generally cylindrical shape in locking engagement with said inside surface of the tubular capacitor short of the respective capacitor end; and
  (d) repeating steps (a), (b) and (c) with a second disc at the other end of the capacitor so that the discs then hold the lead in position longitudinally and transversely with the lead centered within the tubular capacitor.

10. The method of claim 9 and further comprising the steps of melting solder plugs in the ends of the capacitor in engagement with the inserts to seal the ends of the filter.

11. A method of manufacturing an electromagnetic interference filter of the type having a tubular capacitor, with an inside surface defining an inside diameter, a central lead coaxial with the capacitor, and an inductive and resistive sleeve extending radially between the lead and the capacitor, the method comprising the steps:
  (a) engaging a disc having a central opening axially over one end of the lead, the opening being proportioned so that the disc is deformed locally about the opening as the disc is forced on to the lead to form an axially extending deformed portion;
  (b) moving the disc along the lead into engagement with an end of the capacitor, the outer diameter of the disc being significantly greater than said inside diameter of the capacitor;
  (c) pushing the disc into the capacitor and along the lead to deform the periphery of the disc into a generally cylindrical shape in locking engagement with said inside surface of the tubular capacitor short of the respective capacitor end; and
  (d) repeating steps (a), (b) and (c) with a second disc at the other end of the capacitor, the second disc being pushed into the capacitor until both discs are in firm engagement with respective ends of the sleeve to retain the sleeve in position longitudinally, and so that the discs then hold the lead in position longitudinally and transversely with the lead centered within the tubular capacitor.

* * * * *